United States Patent
Kazmin et al.

(10) Patent No.: US 10,027,190 B2
(45) Date of Patent: Jul. 17, 2018

(54) PERMANENT MAGNET ROTOR HAVING A COMBINED LAMINATED STACK AND METHOD OF ASSEMBLY

(75) Inventors: Evgeny Victorovich Kazmin, Moscow (RU); Gary Randall Barnes, Schenectady, NY (US); Yury Danilovich Vinitzky, Moscow (RU); Ronghai Qu, Wuhan (CN); Mikhail Avramovich Avanesov, Moscow (RU)

(73) Assignee: General Electric Company, Schenectady, NY (US)

( * ) Notice: Subject to any disclaimer, the term of this patent is extended or adjusted under 35 U.S.C. 154(b) by 952 days.

(21) Appl. No.: 14/241,276

(22) PCT Filed: Aug. 26, 2011

(86) PCT No.: PCT/RU2011/000649
§ 371 (c)(1),
(2), (4) Date: Jun. 9, 2014

(87) PCT Pub. No.: WO2013/032353
PCT Pub. Date: Mar. 7, 2013

(65) Prior Publication Data
US 2014/0292132 A1    Oct. 2, 2014

(51) Int. Cl.
*H02K 1/27*    (2006.01)
*H02K 15/03*    (2006.01)

(52) U.S. Cl.
CPC .......... *H02K 1/2706* (2013.01); *H02K 1/2766* (2013.01); *H02K 15/03* (2013.01); *H02K 2213/03* (2013.01); *Y10T 29/49012* (2015.01)

(58) Field of Classification Search
CPC ............ Y10T 29/49012; H02K 1/2706; H02K 1/2766; H02K 15/03; H02K 2213/03
(Continued)

(56) References Cited

U.S. PATENT DOCUMENTS

| 4,139,790 A | * | 2/1979 | Steen | ................ | H02K 21/46 |
| | | | | | 310/156.83 |
| 4,712,027 A | * | 12/1987 | Karidis | ................ | H02K 1/08 |
| | | | | | 310/12.02 |

(Continued)

FOREIGN PATENT DOCUMENTS

| GB | 564865 | 10/1944 |
| JP | H09-19120 A | 1/1997 |

(Continued)

OTHER PUBLICATIONS

International Search Report cited in PCT/RU2011/000649 completed May 29, 2012.

(Continued)

*Primary Examiner* — Bernard Rojas
*Assistant Examiner* — Rashad Johnson
(74) *Attorney, Agent, or Firm* — Nixon & Vanderhye P.C.

(57) ABSTRACT

A rotor for an electromagnetic apparatus including: ferromagnetic laminates stacked along a longitudinal axis of the rotor; non-magnetic laminates stacked along the longitudinal axis, wherein the non-magnetic laminates are between the ferromagnetic annular laminates; cavities in the rotor formed by aligned slots in the ferromagnetic and non-magnetic laminates, wherein the cavities are parallel to the axis of the rotor, and a permanent magnet(s) in each of the aligned cavities. The laminates may each be an annular disc or may be segments arranged in an annular array around a shaft of the rotor.

16 Claims, 8 Drawing Sheets

(58) Field of Classification Search
USPC .......................... 310/156.51, 156.52, 261.1
See application file for complete search history.

(56) References Cited

U.S. PATENT DOCUMENTS

| | | | |
|---|---|---|---|
| 4,916,346 A | 4/1990 | Kliman | |
| 5,117,553 A | 6/1992 | Kliman | |
| 5,463,262 A * | 10/1995 | Uchida | H02K 1/2773 |
| | | | 310/156.55 |
| 7,385,328 B2 * | 6/2008 | Melfi | H02K 1/278 |
| | | | 310/156.45 |
| 2004/0245883 A1 | 12/2004 | Mitcham et al. | |
| 2006/0284512 A1 * | 12/2006 | Lee | H02K 1/246 |
| | | | 310/216.008 |
| 2008/0179980 A1 | 7/2008 | Dawsey et al. | |
| 2008/0224558 A1 * | 9/2008 | Ionel | H02K 1/2766 |
| | | | 310/156.57 |
| 2009/0224624 A1 * | 9/2009 | Kumar | H02K 1/276 |
| | | | 310/156.53 |
| 2009/0230803 A1 * | 9/2009 | Nakayama | H02K 1/2766 |
| | | | 310/156.56 |
| 2012/0007455 A1 * | 1/2012 | Tanaka | F04B 35/04 |
| | | | 310/66 |
| 2012/0086291 A1 * | 4/2012 | DeBlock | H02K 1/20 |
| | | | 310/61 |
| 2012/0098359 A1 * | 4/2012 | Morozumi | H02K 7/04 |
| | | | 310/51 |
| 2014/0070658 A1 * | 3/2014 | Hamer | F28F 3/086 |
| | | | 310/216.004 |

FOREIGN PATENT DOCUMENTS

| | | |
|---|---|---|
| JP | 2008-011692 A | 1/2008 |
| WO | 2009146189 | 12/2009 |

OTHER PUBLICATIONS

Edward Lovelace, "Mechanical Design Considerations for Conventionally Laminated, High-Speed, Interior PM Synchronous Machine Rotors", IEEE Transactions on Industry Applications, vol. 40, No. 3, May/Jun. 2004, pp. 806-812.

Notice of Preliminary Rejection issued in connection with corresponding KR Application No. 2014-7004740 dated Sep. 7, 2017.

* cited by examiner

PERMANENT MAGNET ROTOR HAVING A COMBINED LAMINATED STACK AND METHOD OF ASSEMBLY

BACKGROUND OF THE INVENTION

The invention relates to the field of laminated rotors for electrical machines and particularly to laminated rotors with interior permanent magnets (PM).

Laminated rotors are typically assembled by stacking laminates, such as annular discs or segments of discs, on a cylindrical ring or directly on the rotor shaft. In a conventional laminated rotor, the laminates are all formed of a ferromagnetic material, such as silicon steel. Insulation layers are interleaved between the laminates. The insulation layers are typically each a coating on ferromagnetic laminates.

Permanent magnets are contained in cavities inside the laminated rotor. Magnetic flux from the magnets extends from the surface of the rotor to the stator. The permanent magnets may be inclined with respect to a chord of the rotor, may be parallel to a chord or having another orientation with respect to a cord. The cavities for the magnets extend parallel to the axis of the rotor and pass through the each of the laminates stacked on the rotor. Typically, the cavities extend to near the outer surface of the rotor.

The bridges associated with the cavities and magnets, especially the bridges near the rotor surface, tend to be thin. The bridges are the rotor material between adjacent cavities and between the cavities and the rotor outer surface. The bridges tend to be made as thin as the rotor material will allow in view of the centrifugal forces and stresses applied to the bridges.

Centrifugal forces are created by rotation of the rotor and the mass of the permanent magnets and laminates. The stresses caused by these centrifugal forces are concentrated at the relatively narrow regions of the laminates between the radially outer ends of the cavities and the outer surface of the rotor. These narrow regions between the radially outer ends of the cavities and the outer surface of the rotor are referred to as outer bridges, or sometimes simple bridges.

Other narrow regions in the rotor include the regions between cavities where there are more than one cavity per pole. These regions are referred to as inner bridges and may also experience stress concentration when subjected to centrifugal forces. Further, the inner bridges may also provide paths for magnet flux leakage.

In addition to centrifugal forces, electromagnetic forces may cause stress concentration in the inner and outer bridges. Electromagnetic forces may be especially strong during short circuit fault conditions. The stresses due to electromagnetic forces may be most noticeable, as compared to centrifugal forces, in medium and low speed machines.

The ferromagnetic materials forming the laminates (laminates) tend to have low tensile strengths and are susceptible to failure under high centrifugal loads. The bridges of the conventional ferromagnetic laminates are made relatively thick (wide) to account for the weak tensile strength of the ferromagnetic material and to withstand the high centrifugal forces resulting from the mass of the permanent magnet bars and the high rotational speed of the rotor.

Bridges provide a parallel path for the magnet flux. One part of magnet flux passes through air gap and links with the stator winding. That is "useful" or "working" part of the magnet flux that contributes to the work performed by the rotor and stator. Another part of magnet flux passes through bridges and does not link with the stator winding. The flux passing through the brides is leaked or lost flux that does not contribute to the work accomplished by the rotor and stator.

The magnetic flux leakage from the rotor increases with the thickness of the bridges in the laminates. The flux leakage occurs as flux, which does not cross air gap between stator and rotor, and does not link with an armature winding in the stator. The design of a conventional laminated PM rotor involves balancing the need for sufficient strength in the bridges of the laminates with the need to reduce magnetic flux leakage.

BRIEF DESCRIPTION OF THE INVENTION

Conventional laminated PM rotors having interior permanent magnets and only ferromagnetic laminates tend to suffer from excessive magnetic flux leakage. One reason for the flux leakage is that the saturation bridges are relatively thick to provide structural support to the rotor. There is a long felt desire to reduce the thickness of the bridges in a laminated rotor and thereby reduce the flux leakage from the rotor with interior permanent magnets.

A rotor has been conceived for an electromagnetic apparatus comprising: a plurality of ferromagnetic laminates stacked along a longitudinal axis of the rotor; a plurality of non-magnetic laminates stacked along the longitudinal axis, wherein the non-magnetic laminates are between the ferromagnetic annular laminates; a plurality of cavities in the rotor formed by aligned slots in the ferromagnetic and non-magnetic laminates, wherein the cavities are parallel to the axis of the rotor, and a permanent magnet in each of the cavities. The laminates may each be an annular disc or may be segments arranged in an annular array around a shaft of the rotor.

In the rotor, the non-magnetic annular laminates may be interleaved between the ferromagnetic annular laminates, and the permanent magnets may be inclined such that one side of each permanent magnet is radially outward from the axis further than the opposite side of the permanent magnet. The non-magnetic laminates may constitute 10 percent to 25 percent of a length of the non-magnetic and ferromagnetic laminates stacked for the rotor. Rods may extend through the laminates, to support the stack of laminates on the rotor. The rods may be radially inward of the slots and radially outward of an inner perimeter of the laminates. Rods extending through the laminates may also be radially outward of the slots and radially inward of an outer perimeter of the laminates at symmetry axis between the magnets.

A cylindrical rotor has been conceived for an electromagnetic apparatus comprising: ferromagnetic laminates stacked along a longitudinal axis of the rotor; non-magnetic laminates stacked along the longitudinal axis, wherein the non-magnetic laminates are stacked between the ferromagnetic annular laminates; cavities formed by slots in the ferromagnetic and non-magnetic laminates, wherein the slots extend through the laminates and the cavities are parallel to the axis of the rotor, and a permanent bar magnet in the cavities, wherein the permanent bar magnet extends parallel to the axis of the rotor. The non-magnetic laminates may constitute 10 percent to 25 percent of a length of the non-magnetic and ferromagnetic laminates stacked for the rotor. The non-magnetic laminations may have thicker bridges than the magnetic laminations. Thick bridges in the non-magnetic laminations would be acceptable because they will not prevent the insertion of magnets.

A method has been conceived to assemble a rotor for a generator comprising: stacking ferromagnetic laminates and non-magnetic laminates along an axis to form a cylindrical rotor, wherein the non-magnetic laminates are stacked between the ferromagnetic laminates; forming cavities in the rotor by aligning slots in the stack of the laminates, and positioning permanent magnets in the aligned cavities of the laminates.

In the method, rods may be positioned axially through the laminates to support the stack of laminates. The slots in the non-magnetic laminates each have a radially outer surface extending radially inward further than a radially outer surface of each of the slots in the ferromagnetic laminates.

DETAILED DESCRIPTION OF THE INVENTION

Figure 1:
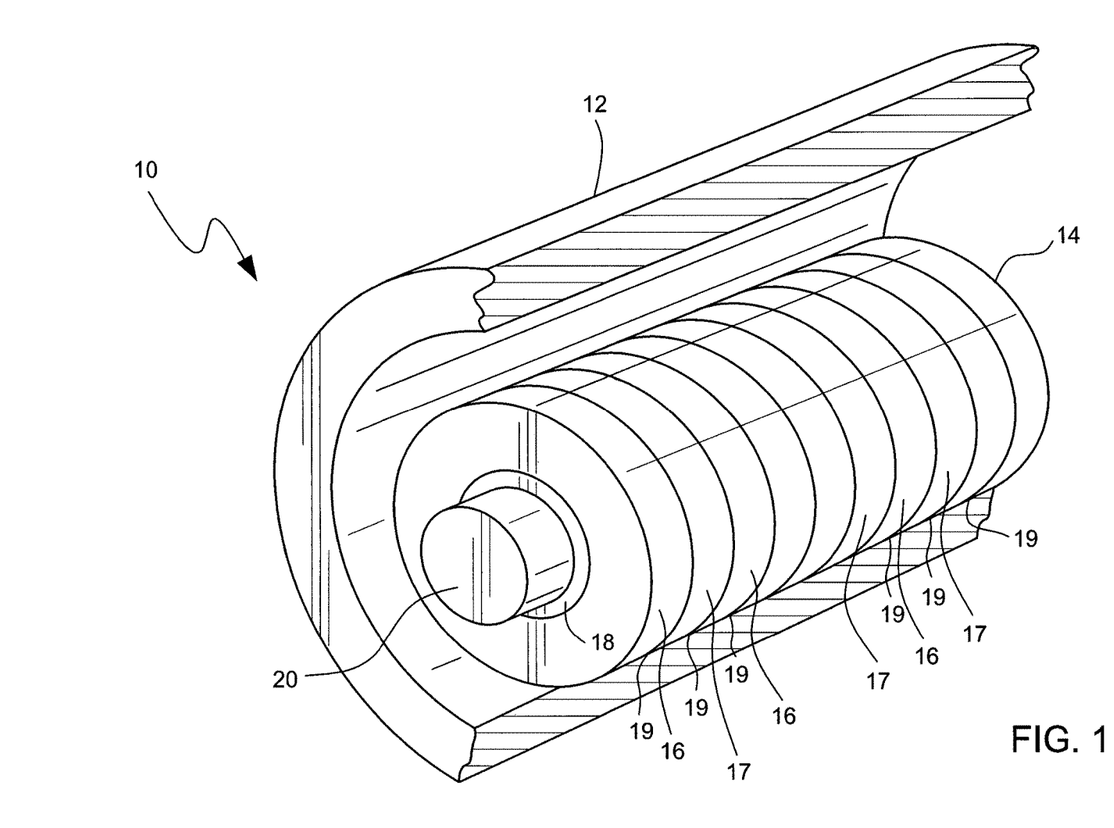
FIG. 1 is a schematic illustration of a rotating electromagnetic machine showing a stator in a cut-away view and a rotor.

FIG. 1 is a schematic illustration of a rotating electromagnetic machine 10 showing a stator 12 in a cut-away view and a laminated rotor 14. The electrical machine may be a motor, wherein the electrical current in the stator drives the rotor by applying an electromagnetic torque on the rotor. The electrical machine may be a generator wherein the rotor is rotatably driven by a turbine and electromotive force (Back-EMF) is generated in coils of the stator.

The rotor 10 includes permanent magnets (PM) within the laminated rotor. The rotor may be a cylindrical stack of laminations, e.g., laminates or laminate segments, 16, 17, mounted on a cylindrical rim 18 or directly to the rotor shaft 20. The rim 18 may be coaxially fitted to the rotor shaft 20 that is mounted on bearings in a casing that houses the rotor and stator. The rim is optional and the laminates may be mounted directly to the rotor shaft.

The laminations 16, 17 may be separated by insulation layers or coatings 19, formed of materials such as resins and non-conductive laminates. The laminates in the rotor are a mix of ferromagnetic laminates 16 and non-magnetic laminates 17.

The ferromagnetic laminates 16 are formed of or include a ferromagnetic material, such as iron. The non-magnetic laminates 17 may be formed of a high-strength material, which need not be magnetic. Examples of the high-strength materials for the laminate 17 include stainless-steel and other types of non-magnetic metals. The non-magnetic laminates may also be formed of materials that have the same strength or less strength than the ferromagnetic material forming the magnetic laminations. If the non-magnetic laminates have a material strength the same or less than the magnetic laminates, the bridges in the non-magnetic laminations may be thicker than the bridges in the magnetic laminates.

The laminates may be stacked on the rotor rim such that the ferromagnetic laminates 16 alternate with the non-magnetic laminates 17. The alternating arrangement may be that at least one non-magnetic laminate is between adjacent ferromagnetic laminates. Similarly, the alternating arrangements may that two, three or more ferromagnetic laminates 16 are stacked together in groups and a non-magnetic laminate 17 is between each group of ferromagnetic laminates 16. An insulation layer 19, such as a resin or non-conductive material, may be between each of the laminates 16 and 17.

The laminates need not all be of the same thickness. For example the ferromagnetic laminates 16 may be relatively thick, e.g., 1.5 mm if formed of iron. Ferromagnetic laminates formed of silicon steel may have a thickness of 0.35 to 0.65 mm. Generally, the higher the frequency of the power in the device, the thinner the magnetic laminations. The thickness of the non-magnetic laminations may be the same, thinner or thicker than the magnetic laminations. The non-magnetic laminations may have a thickness no greater than 2 mm.

The proportion of the length of the stacked rotor formed of the non-magnetic laminates 17 is preferred to be as large as possible, but such that it does not reduce an useful air-gap flux. An exemplary range of the amount of non-magnetic laminates in a rotor stack is 10 percent to 25 percent. Further increase of amount of non-magnetic laminates could provide reduction of an air-gap flux, and lead to a negative overall effect.

Figure 2:
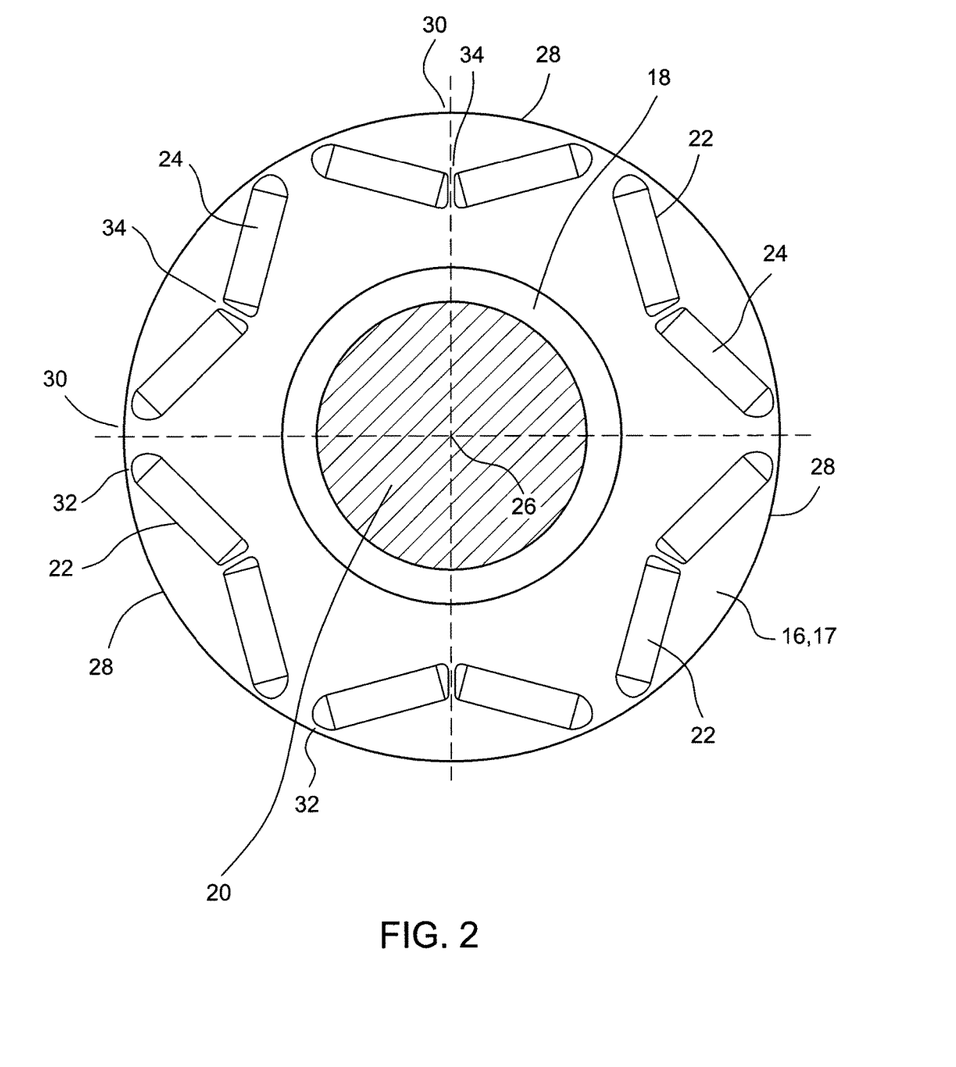
FIG. 2 schematically shows the rotor in a cross-section perpendicular to the rotor axis.

FIG. 2 is a schematic view of the rotor 14 showing an annular laminate 16 or 17 on the rotor rim 18. Cavities formed by slots 22 in the rotor laminates provide recesses to receive the permanent magnets 24. The slots 22 may be sized to receive the permanent magnets, and oriented at an incline with respect to a chord of the disc. The cavities in each of the rotor laminates are aligned such that the cavities extend parallel to the axis 26 of the rotor.

The permanent magnets 24 may be arranged in the rotor such that magnetic poles 30 are symmetrically arranged around the circumference of the rotor. The poles are alternating North and South poles. The magnets need to be arranged such that the sides of adjacent magnets 24 have the same polarity, which define the polarity of the respective pole of the rotor. The rotor may have full symmetry of the permanent magnets about each pole 30. In particular, each half of a pole in the rotor may be symmetrical with respect to the other half of the pole. Further, the angular pole pitch between each of the poles 30 may be uniform for all poles in the rotor. The number of poles in a rotor may be greater than shown in FIG. 2, which is intended to illustrate an example of a stacked PM rotor and not to show a limiting case for such a rotor.

The slots 22 in the annular laminates 16, 17 may be positioned near the outer cylindrical surface 28 of the rotor laminates 16. Bridges 32, 34, also referred to as saturation bridges, are regions in the annular laminates between the slot and the outer perimeter of the disc. An outer bridge 32 is formed by the rotor material between radially outer corner of the slot and the outer surface 28 of the rotor. The outer bridges tend to be the narrowest region of the annular laminates. An inner bridge 34 is formed in each laminate between the radially inward outer corner of the slots. The bridges 32, 34 provide structural support to the permanent magnets 24 in the slots. The bridges 32, 34 withstand the centrifugal forces resulting from the rotating applied to the magnets 24 and stack of rotor laminates 16, 17.

Figure 3:
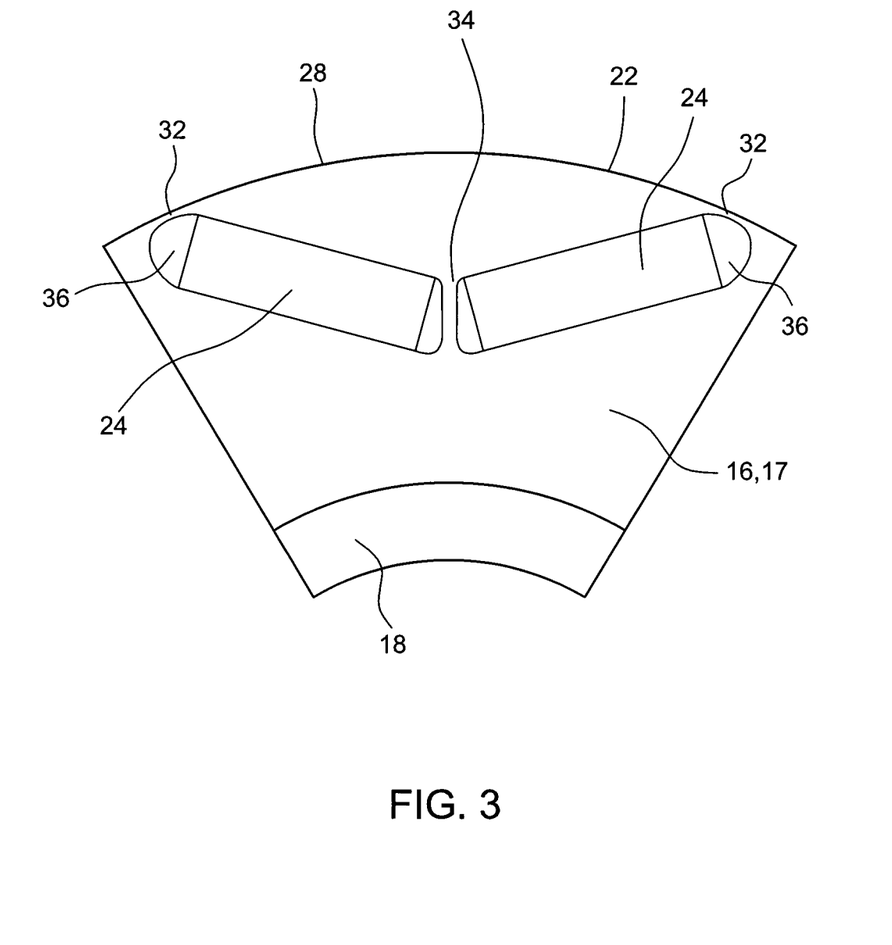
FIG. 3 is an enlarged view of a section of a rotor laminate or of a laminate segment.

FIG. 3 shows an enlarged schematic view of a portion of one of the annular laminates 16, 17 to clearly show the slots (cavities) 22 in the laminates. The slots 22 may have cross-sections that are generally race-track shapes. The slots are shaped to receive the permanent magnets 24. The cross-section, e.g., size and shape, of the slots generally confirms to the cross-section of the permanent magnets to be inserted in the slots.

Non-magnetic spacers 36 in the slots support the magnets and prevent the magnets from sliding in the slots. The non-magnetic spacers may be conventional bars adjacent the sides of the magnets. The cross-sectional shape of the spacers conforms to the sidewalls of the slots. The spacers may be bars extending the length of the stacked rotor or a series of blocks arranged end to end in the rotor. The spacers may be formed of a ductile material, such as a plastic or soft metal. Alternatively the spacers may be an epoxy filled region.

FIG. 3 is useful to illustrate an alternative lamination in which each lamination is a segment of an annulus rather than an entire annulus as shown in FIG. 2. The lamination segment is arranged with other similar segments to form an annular array of segments. Each annular array of lamination segments may be entirely non-magnetic laminations, entirely magnetic laminations, or a combination of non-magnetic lamination segments and magnetic lamination segments. As with the stack rotors shown in FIG. 2, a stacked rotor formed of annular arrays of lamination segments may have alternating magnetic and non-magnetic laminations stacked in a direction of the rotor axis.

Lamination segments may be suited for large rotors. Each lamination segment may have a span, e.g., an arc, of at least twice the span angle of one pole in the rotor. By way of example, a lamination segment may span of three poles.

Each pole has a pair of associated internal magnets. There may be one pole angle shift between adjacent layers to provide overlapping.

The segments may be arranged in an annular array directly on the rotor shaft or around a ring, collar or rim on the rotor shaft. The arrays of segments are stacked layer by layer on the rotor.

Figure 4:
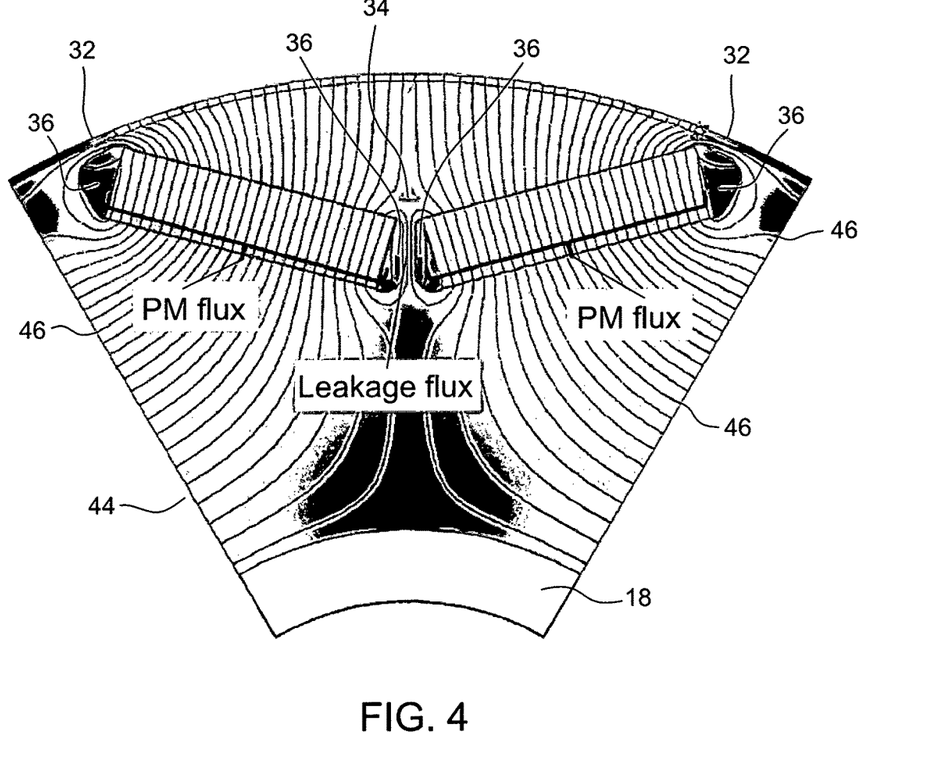
FIG. 4 is a schematic view of a lamination showing flux lines through the lamination and, particularly, through the bridges in the lamination.

FIG. 4 is a diagram of a magnetic lamination 44, which may be a lamination segment or a portion of an annular lamination. The magnetic lines 46 on the lamination show the flux density distribution over one rotor pole pitch region. Except at the region of the bridges the flux densities in the lamination 44 are relatively low as indicated by the wide gaps between lines. As a frame of reference, the flux densities may be below 1 Tesla in the regions of the lamination 44 except for the bridges. The flux densities in and near the bridges 32, 34 may be up to 2.5 Tesla, as indicated by the narrow gaps between the flux lines 46 at the bridges.

At the bridges, the flux density reaches saturation that limits the leakage flux. Nevertheless, leakage flux through the bridges may be, as an example, as much as thirty percent (30%) of the air-gap flux. The total PM flux is a sum of air-gap and leakage fluxes. A 30% loss to flux leakage through the bridges is a concern.

Figure 5:
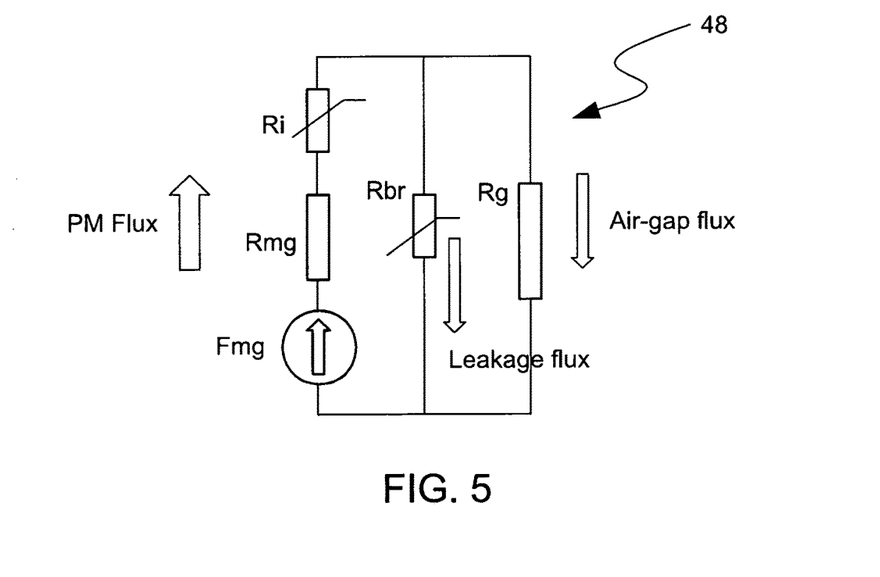
FIG. 5 is a circuit diagram illustrating flux flow through a rotor.

FIG. 5 is a simplified equivalent magnetic circuit 48 of the rotor having magnetic and non magnetic laminations. The magnetic circuit 48 schematically illustrates the flux through the rotor. The term Fmg is the magnetomotive force of the permanent magnets, Rmg is the internal magnetic resistance of the permanent magnets, Rg is the magnetic resistance of the air-gap between the rotor surface and the stator, Rbr is the combined magnetic resistance of the bridges, and Ri is the magnetic resistance of the laminations. For purposes of this example, Ri is a small resistance because of low flux densities in the laminations.

The addition of non-magnetic laminations to a rotor stack having magnetic laminations leads to an increase in the resistances Rbr and Ri, such as by about twenty percent (20%). Because Ri is relatively small, the increase in. Ri does not substantially affect PM and the air-gap flux. The increase in the magnetic resistance at the bridges (Rbr) resulting from the non-magnetic laminations results in slight reduction in the total PM flux and a substantial increase in the desired air-gap flux. The substantial increase in the air-gap flux is because of the significant reduction in leakage flux through the bridges which is allowed for by the use of the non-magnetic laminations.

Figure 6:
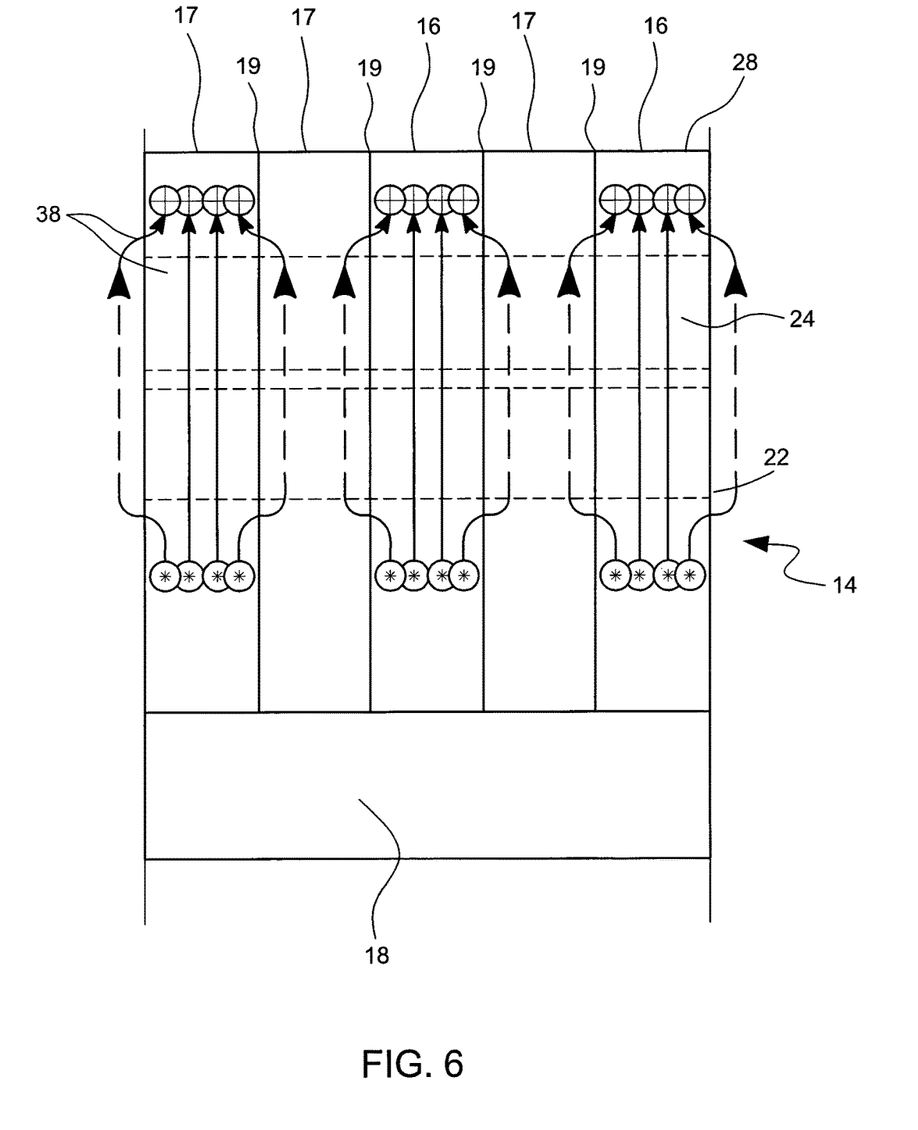
FIG. 6 is an enlarged cross-sectional view of a portion of the rotor, wherein the cross-section is taken along the rotor axis and flux lines are shown.

FIG. 6 is a schematic illustration of a portion of a PM laminated rotor 14 shown in cross-section in a plane parallel to the axis of the rotor. The rotor is formed by a stack of ferromagnetic laminates 16 and non-magnetic laminates 17, with insulation layers 19 separating the laminates. The laminates have slots 22 which extend through the stack of laminates forming the rotor 14. The slots contain permanent magnets 24. The laminates are mounted on a cylindrical ring 18.

The magnetic flux lines 38 shown in FIG. 6 illustrate that flux flows primarily through the ferromagnetic laminates 16. Due to the orientation of the poles of the magnetic bars 24 in the rotor, the magnetic flux flows generally along radial lines in the rotor. The flux is concentrated in the ferromagnetic laminates because of their high magnetic permeability as compared to the permeability of the non-magnetic laminates. The flux is less concentrated, as indicated by the single dotted lines, in the non-ferromagnetic laminates.

Figure 7:
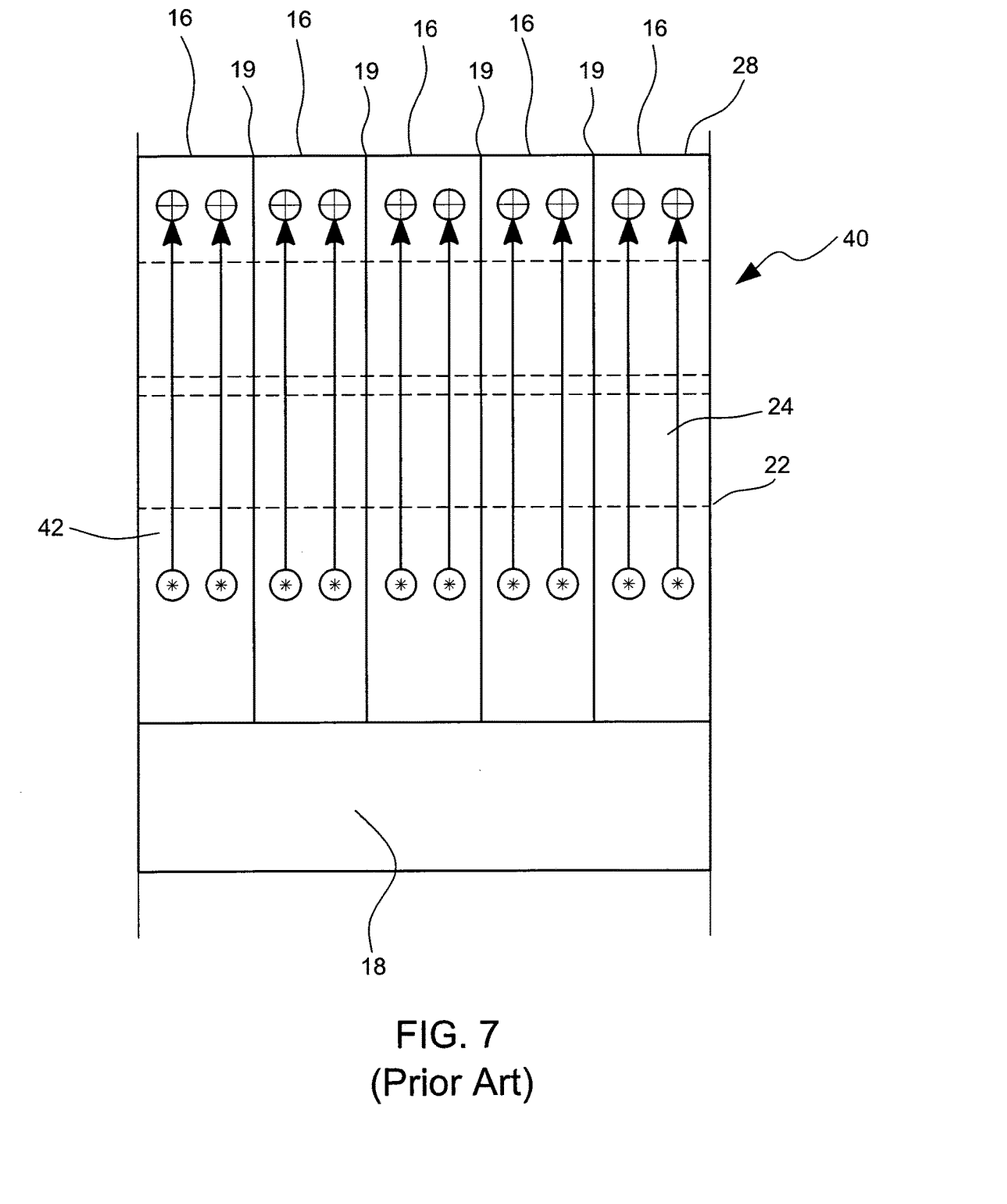
FIG. 7 is an enlarged cross-sectional view of a portion of a prior art rotor, wherein the flux of the permanent magnet is shown by arrows.

FIG. 7 is a schematic illustration of a conventional rotor 40 formed entirely of ferromagnetic laminates 16, but is otherwise comparable to the rotor 14 illustrated in FIG. 6. The magnetic flux 42 generated by the permanent magnets 24 is uniformly distributed in all laminates.

The uniform flux distribution in a conventional, all ferromagnetic laminated rotor 40 is in contrast to the concentration of flux in the ferromagnetic laminates in the rotor 14 formed of non-magnetic and ferromagnetic laminates 16, 17, illustrated in FIG. 6. Due to the flux concentration, the flux density in the ferromagnetic laminates 16 of the rotor 14 is believed to be greater than the flux density in a comparable rotor 40 formed entirely of ferromagnetic laminates.

A comparison was made between a generator with a rotor of entirely ferromagnetic laminates and a similar generator except its rotor was eighty-four percent (84%) ferromagnetic laminates and sixteen percent (16%) non-magnetic (stainless steel) laminates, wherein the percentages are with respect to the axial length of the rotor. Both generators were designed to deliver the same output power while being operated at the same fixed rotational speed and same fixed line-voltage. Table 1 below provides a comparison of these two generators:

TABLE 1

| Parameter | Unit | Entirely ferromag. laminates | 84% ferromag. and 16% non-mag. laminates |
|---|---|---|---|
| Rotor Stacking Factor | — | 0.96 | 0.8 |
| Back-emf per unit axial length(RMS) | V/m | 1218 | 1265 |
| Stator and rotor stack length | % | 100% | 96% |
| Total Active Mass | % | 100% | 96% |

In the exampled shown in Table 1, a PM generator having a rotor with non-magnetic and ferromagnetic laminates has an higher back-emf and output power for each unit length of the rotor, as compared to the generator having a rotor formed entirely of ferromagnetic laminates. Due to the higher back-emf and output power per rotor unit length, the active length of a rotor having some non-magnetic laminates may be shorter, e.g., four percent shorter, for a comparable rotor that is formed entirely of ferromagnetic laminates. The reduced rotor length allows for a reduction in the size, e.g., volume and mass, of the electrical machine due to the rotor having non-magnetic and ferromagnetic laminates. Reducing the mass of the machine generally results in a reduction in the cost of the machine.

Other advantages provided by incorporating non-magnetic and ferromagnetic laminates in a rotor with interior permanent magnets include: (i) relatively thin saturation bridges in the ferromagnetic laminates, (ii) increased rotor strength due to the high strength or thickness of the non-magnetic laminates, (iii) enhanced thermal conductivity and improved rotor heat removal due to the high conductivity of the non-magnetic laminates.

Figure 8:
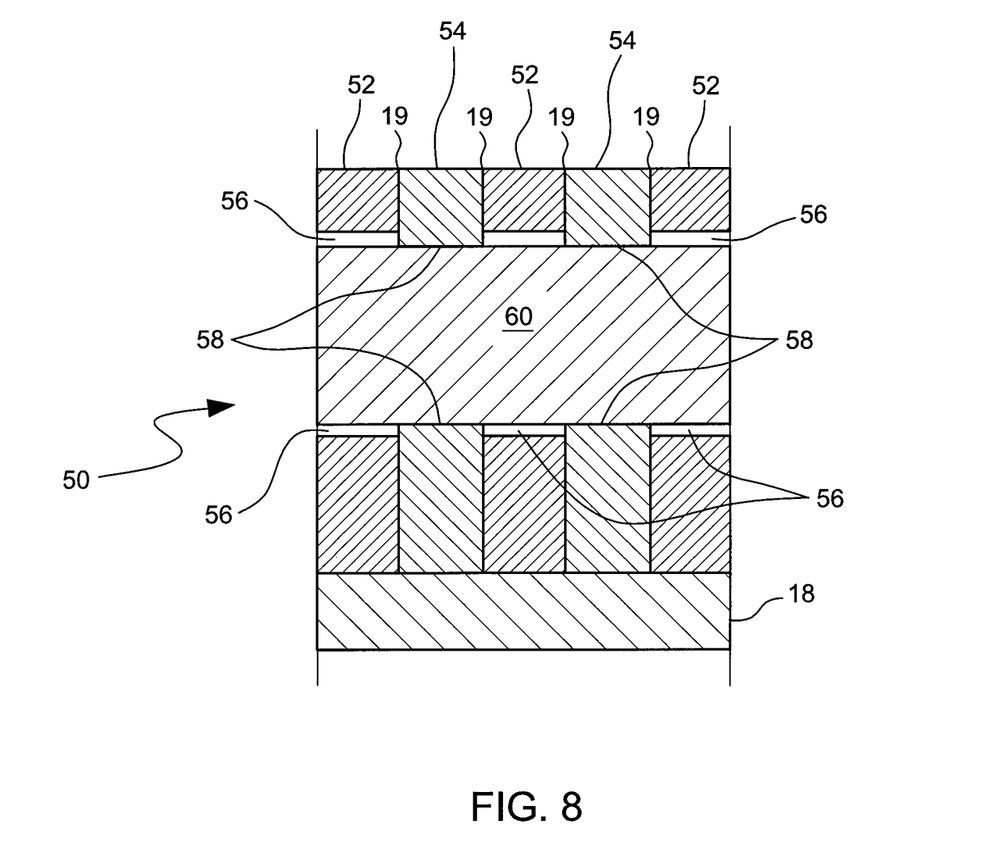
FIG. 8 is an enlarged cross-sectional view of a second embodiment of stacked laminates for a rotor.

FIG. 8 is a schematic diagram showing in cross-section a laminated rotor 50 formed of a stack of ferromagnetic laminates 52 and non-magnetic laminates 54. The laminates have aligned slots 56, 58 that define cavities in the rotor to receive permanent magnet bars 60.

The slots 56 in ferromagnetic laminates 52 are slightly offset in a radially outward direction from the slots 58 in the non-magnetic laminates 54. The slots 56 in the non-magnetic laminates may be a few millimeters, e.g., 1 to 3 mm, offset from the slots 58 in the ferromagnetic laminates in a radially inward direction. This radial offset may be created by making the slots 58 in the non-magnetic laminates narrower than the slots 56 in the ferromagnetic laminates.

The radial offset causes the slots 58 of the non-magnetic laminates to abut against the permanent magnet while the slots of the ferromagnetic laminate may not abut against the magnet 60. The abutment between the magnet and the slot of the non-magnetic laminate may include a wrapping or other film or thin sheet which protects the magnet. The radial offset is minimized to avoid flux reduction. The radial offset may be less than 1 mm.

Because of the abutting relationship, the non-magnetic laminates support the permanent magnet. The tensile strength and ductility of the non-magnetic disc, e.g., stainless steel, are better suited to supporting the magnets than are the ferromagnetic laminates. The offset or narrower slots in the non-magnetic laminates ensure that they bear the centrifugal load of the permanent magnets. Because of their wider slots or radially outward offset slots, the ferromagnetic laminates do not bear the centrifugal forces of the permanent magnet.

Figure 9:
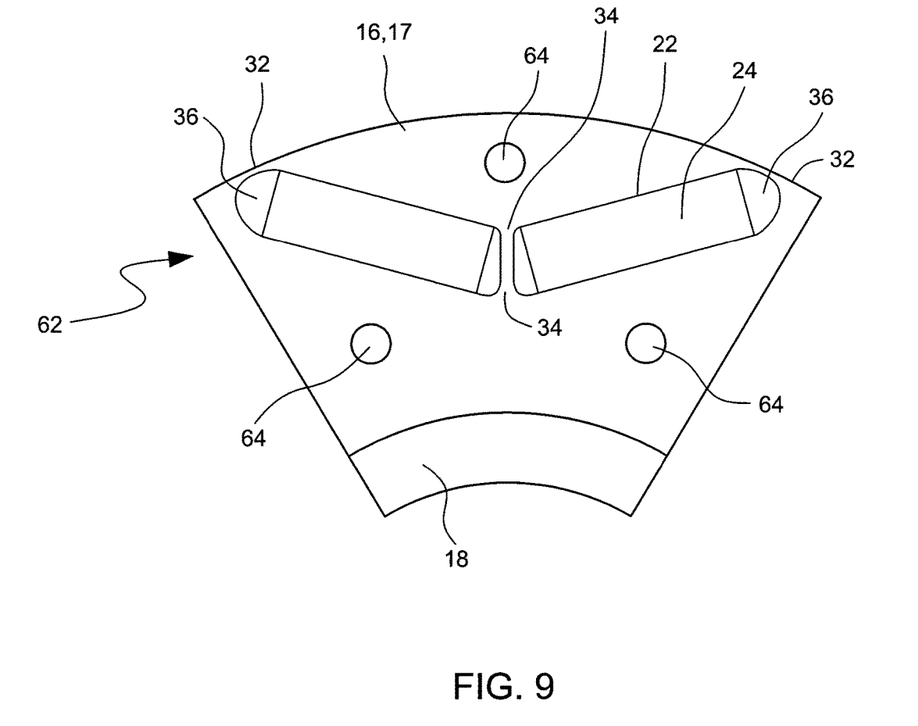
FIG. 9 schematic illustration of a portion a laminate or of a laminate segment having openings for rods extending through the rotor.

FIG. 9 schematic illustration of a portion the laminates, 16, 17 (or 44, 46) of an alternative PM laminated rotor 62 having ferromagnetic and non-magnetic laminates. The rotor 62 includes rods 64 extending through the laminates. The rods may be formed of a magnetic material or a non-magnetic material, such as stainless steel. The rods extend through openings in each of the laminates. The openings for the rods 64 may be radially inward of the slots and at the inner bridge 34 of the laminates.

The rods ensure that the laminates remained aligned in the stack forming the rotor, and that the slots of the laminates remain aligned in the rotor. In addition, the rods may allow centrifugal forces from the ferromagnetic laminates to be distributed, at least in part, to the non-magnetic laminates. Further, the rods may be used to clamp together the laminates by using threaded ends of the rods and bolts to secure end plates at opposite ends of the rotor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

| Ref. Nos. | Description |
|---|---|
| 10 | Rotating machine |
| 12 | Stator |
| 14 | rotor |
| 16, 17 | discs |
| 18 | Rotor rim |
| 19 | Insulation layer |
| 20 | Rotor shaft |
| 22 | Slots in rotor discs |
| 24 | Permanent magnets |
| 26 | Rotor axis |
| 28 | Cylindrical surface of rotor |
| 30 | Magnetic poles |
| 32 | Outer bridge |
| 34 | Inner bridge |
| 36 | Non-magnetic spacer |
| 38 | magnetic flux lines |
| 40 | Conventional rotor FIG. 7 |
| 42 | Magnetic flux - FIG. 7 |
| 44 | Lamination in FIG. 4 |
| 46 | Magnetic flux lines |
| 48 | Magnetic circuit |
| 50 | Rotor - FIG. 8 |
| 52 | Ferromagnetic laminate |
| 54 | Non-ferromagnetic laminate |
| 56 | Slots |
| 58 | Slots |
| 60 | magnet |
| 62 | Rotor of FIG. 9 |
| 64 | Rods |

What is claimed is:

1. A rotor for an electromagnetic apparatus comprising:
   a plurality of ferromagnetic disc laminates stacked along a longitudinal axis of the rotor;
   a plurality of non-magnetic disc laminates stacked along the longitudinal axis, wherein the non-magnetic disc laminates are between the ferromagnetic disc laminates;
   a plurality of cavities in the rotor formed by aligned slots in the ferromagnetic and non-magnetic disc laminates, wherein the cavities are parallel to the axis of the rotor and a perimeter of each of the cavities is entirely bordered by one of the ferromagnetic and non-magnetic disc laminates, wherein the aligned slots in the non-magnetic disc laminates each have a radially outward surface which extends radially inward further than a radially outer surface of each of the aligned slots in the ferromagnetic disc laminates, and a plurality of permanent magnets, wherein each of the cavities includes a respective one of the plurality of permanent magnets.

2. The rotor of claim 1 wherein the non-magnetic disc laminates are each sandwiched between two of the ferromagnetic disc laminates.

3. The rotor of claim 1 wherein the permanent magnets are inclined such that one side of each permanent magnet is radially outward from the axis further than the opposite side of the permanent magnet.

4. The rotor of claim 1 wherein the non-magnetic disc laminates constitute 10 percent to 25 percent of a length of the non-magnetic and ferromagnetic disc laminates stacked for the rotor.

5. The rotor of claim 1 further comprising a plurality of rods extending through the non-magnetic and ferromagnetic disc laminates, wherein the rods are radially inward of the aligned slots and radially outward of an inner perimeter of the non-magnetic and ferromagnetic disc laminates.

6. The rotor of claim 1 wherein an insulation layer is between opposing pairs of the non-magnetic and ferromagnetic disc laminates in the stack.

7. A cylindrical rotor for an electromagnetic apparatus comprising:

ferromagnetic disc laminates stacked along a longitudinal axis of the rotor;

non-magnetic disc laminates stacked along the longitudinal axis, wherein the non-magnetic disc laminates are stacked between the ferromagnetic disc laminates;

cavities formed by slots in the ferromagnetic and non-magnetic disc laminates, wherein the slots extend through the disc laminates, a perimeter of each of the slots is entirely bordered by one of the disc laminates, and the cavities are parallel to the axis of the rotor, and wherein the slots in the non-magnetic disc laminates each have a radially outer surface extending radially inward further than a radially outer surface of each of the aligned slots in the ferromagnetic disc laminates; and a plurality of permanent bar magnets, wherein each of the cavities includes a respective one of the plurality of permanent bar magnets and wherein the permanent bar magnet extends parallel to the axis of the rotor.

8. The rotor of claim 7 wherein the non-magnetic disc laminates constitute 10 percent to 25 percent of a length of the non-magnetic and ferromagnetic disc laminates stacked for the rotor.

9. The rotor of claim 7 further comprising a plurality of rods extending through the disc laminates, wherein the rods are radially inward of the slots and radially outward of an inner perimeter of the disc laminates.

10. The rotor of claim 7 wherein the permanent magnet abuts the radially outer surface of the aligned slots in the non-magnetic disc laminates and does not abut the radially outer surface of the aligned slots of the ferromagnetic disc laminates.

11. A rotor for an electromagnetic apparatus comprising:

ferromagnetic disc laminates stacked along a longitudinal axis of the rotor, wherein a first slot in each of the ferromagnetic disc laminates has a perimeter entirely bordered by a respective one of the ferromagnetic disc laminate;

non-magnetic disc laminates stacked along the longitudinal axis and the non-magnetic disc laminates are between the ferromagnetic disc laminates, wherein a second slot in each of the non-magnetic disc laminates has a perimeter entirely bordered by a respective one of the non-magnetic disc laminates and each of the second slots has a radially outer surface extending radially inward further than a radially outer surface of each of the first slots;

cavities in the rotor formed by aligning the first and second slots along the longitudinal axis, and a plurality of permanent magnets, wherein each of the cavities receives a respective one of the plurality of permanent magnets.

12. The rotor of claim 11 wherein the non-magnetic disc laminates are sandwiched between the ferromagnetic disc laminates.

13. The rotor of claim 11 wherein the permanent magnets are inclined such that one side of each of the permanent magnets is radially outward from the axis further than the opposite side of the permanent magnet.

14. The rotor of claim 11 wherein the non-magnetic disc laminates constitute 10 percent to 25 percent of a length of the non-magnetic and ferromagnetic disc laminates stacked for the rotor.

15. The rotor of claim 11 further comprising rods extending through the ferromagnetic laminates and the non-magnetic disc laminates, wherein the rods are radially inward of the first and second slots.

16. The rotor of claim 11 further comprising an insulation layer between each of the ferromagnetic disc laminates and the non-magnetic disc laminates.

* * * * *

UNITED STATES PATENT AND TRADEMARK OFFICE
CERTIFICATE OF CORRECTION

PATENT NO. : 10,027,190 B2
APPLICATION NO. : 14/241276
DATED : July 17, 2018
INVENTOR(S) : Kazmin et al.

Page 1 of 1

It is certified that error appears in the above-identified patent and that said Letters Patent is hereby corrected as shown below:

In the Specification

Column 4, Line 47, change "The poles" to --The poles 30--

Column 6, Line 14, change "in. Ri" to --in Ri--

Signed and Sealed this
Twenty-fifth Day of December, 2018

Andrei Iancu
*Director of the United States Patent and Trademark Office*